United States Patent
Potter et al.

(10) Patent No.: US 7,831,427 B2
(45) Date of Patent: Nov. 9, 2010

(54) CONCEPT MONITORING IN SPOKEN-WORD AUDIO

(75) Inventors: Stephen Frederick Potter, Seattle, WA (US); Tal Saraf, Seattle, WA (US); David Gareth Ollason, Seattle, WA (US); Steve Sung-Nam Chang, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 703 days.

(21) Appl. No.: 11/765,923

(22) Filed: Jun. 20, 2007

(65) Prior Publication Data

US 2008/0319750 A1    Dec. 25, 2008

(51) Int. Cl.
*G10L 15/28*   (2006.01)

(52) U.S. Cl. .................. 704/255; 704/235; 704/270

(58) Field of Classification Search .............. 704/270, 704/231, 235, 251, 257, 270.1, 272, 276, 704/255, 7, 1, 9
See application file for complete search history.

(56) References Cited

U.S. PATENT DOCUMENTS 7,502,741 B2 *  3/2009  Finke et al. ............... 704/270

2004/0111259 A1 *  6/2004  Miller et al. .............. 704/231
2004/0175036 A1 *  9/2004  Graham .................... 382/173

OTHER PUBLICATIONS

U.S. Appl. No. 11/009,630, dated Dec. 2004, Xiao, Li.
U.S. Appl. No. 11/401,823, dated Apr. 2006, Barton. W.
U.S. Appl. No. 11/449,354, dated Jun. 2006, Mukerjee, K. et al.

* cited by examiner

*Primary Examiner*—Huyen X. Vo
(74) *Attorney, Agent, or Firm*—Woodcock Washburn LLP

(57) ABSTRACT

Monitoring a spoken-word audio stream for a relevant concept is disclosed. A speech recognition engine may recognize a plurality of words from the audio stream. Function words that do not indicate content may be removed from the plurality of words. A concept may be determined from at least one word recognized from the audio stream. The concept may be determined via a morphological normalization of the plurality of words. The concept may be associated with a time related to when the at least one word was spoken. A relevance metric may be computed for the concept. Computing the relevance metric may include assessing the temporal frequency of the concept within the audio stream. The relevance metric for the concept may be based on respective confidence scores of the at least one word. The concept, time, and relevance metric may be displayed in a graphical display.

20 Claims, 5 Drawing Sheets

300

```
┌─────────────────────────────────────┐
│ Recognizing a plurality of words    │
│ from an audio stream                │
└─────────────────────────────────────┘
            │  ⟵ 302
            ▼
┌─────────────────────────────────────┐
│ Removing function words from the    │
│ plurality of words                  │
└─────────────────────────────────────┘
            │  ⟵ 304
            ▼
┌─────────────────────────────────────┐
│ Determining a concept from at least │
│ one word recognized from the audio  │
│ stream                              │
└─────────────────────────────────────┘
            │  ⟵ 306
            ▼
┌─────────────────────────────────────┐
│ Associating the concept with a time │
│ within the audio stream when the at │
│ least one word was spoken           │
└─────────────────────────────────────┘
            │  ⟵ 308
            ▼
┌─────────────────────────────────────┐
│ Computing a relevance metric for    │
│ the concept                         │
└─────────────────────────────────────┘
            │  ⟵ 310
            ▼
┌─────────────────────────────────────┐
│ Displaying a graphical interface    │
│ including the concept and an        │
│ indication of the time and          │
│ relevance metric                    │
└─────────────────────────────────────┘
            ⟵ 312
```

FIG. 3

CONCEPT MONITORING IN SPOKEN-WORD AUDIO

BACKGROUND

Increasingly, digitally distributed audio may be used for business and social communications. For example, conference calls, webcasts, real-time web meetings, podcasts, and the like may be used to exchange information and share ideas. The audio stream may include vocal communications among participants. For example, an audio stream for a conference call may include the vocal communication of those present.

Typically, a participant may be present and attentive for the entire duration of the audio stream. Even if the participant may not be interested in all that is being discussed, generally, the participant may listen to the entire audio stream waiting for particular subject matter to become the topic of discussion.

For example, publicly traded companies typically hold conference calls for industry analysts. Although an analyst may be tracking a single target company, the analyst may nonetheless be interested in any mention of the target company in any of the many conference calls of other companies in the same industry as the target company. Thus, even though the analyst may only be interested in the target company, the analyst may have to listen to many conference calls in their entirety merely waiting to hear if the target company is ever mentioned.

Also for example, a participant may join a live audio stream after it has begun, and the participant may be interested in subject matter that has already been discussed. It may be impossible for the participant to know what has already been discussed in real-time, so the participant may have to listen to the entire duration of the audio stream waiting for a topic that has already past. Even at the conclusion of the audio stream, the participant may not be able to confirm that the subject matter had already been discussed.

Typically, a conference call may include an agenda that establish topics and the order in which they will be discussed. For example, the agenda may include an outline, a slide deck, background documents, a reference to a website, and the like. The agenda may be prepared beforehand, and may not reflect real-time changes in the subject matter of the conference call. Because the agenda may not accurately reflect the topics being discussed, the participant interested in a specific topic may not be able to rely on the agenda to identify the best time at which to join the conference.

Thus, there is a need for an effective identification of topics and their temporal location within an spoken-word audio stream.

SUMMARY

Monitoring a spoken-word audio stream for a relevant concept is disclosed. A speech recognition engine may recognize a plurality of words from the audio stream. Function words that do not indicate content may be removed from the plurality of words.

A concept may be determined from at least one word recognized from the audio stream. The concept may be determined via a morphological normalization of the plurality of words. The concept may be determined by applying a pre-trained classifier to the plurality of words. A confidence score may be determined for each word of the plurality of words, and the concept may be determined via screening each word according to a comparison of the respective confidence score and a confidence threshold. The confidence score may be adjusted according to statistical characteristics of temporally proximate words.

A keyword may be received from a user, and the concept may be filtered based on the keyword. A statistical language model may be optimized with a contextual document associated with the audio stream, and the plurality of words may be recognized according to the statistical language model.

The concept may be associated with a time when the at least one word was spoken and may compute a relevance metric for the concept. Computing the relevance metric may include assessing the temporal frequency of the concept within the audio stream. The relevance metric for the concept may be based on the respective confidence score of each word from which the concept was determined. The concept, time, and relevance metric may be displayed in a graphical display.

A computer user interface for monitoring a spoken-word audio stream for a relevant concept is also disclosed. The computer user interface may include a displayed concept, a displayed indication of a time associated with the concept, and a displayed indication of a relevance metric associated with the concept.

The concept may be displayed as a graphical bar. The position of the graphical bar may change relative to the time associated with the concept. The size of the graphical bar may change relative to the relevance metric associated with the concept. The graphical bar may include a color that changes relative to the relevance metric. The displayed concept may include a font size that may be relative to the relevance metric. The displayed concept may scroll at a speed relative to the relevance metric.

A system for monitoring a spoken-word audio stream for a relevant concept may include a concept processing engine and a user interface. The concept processing engine may determine a concept from at least one word recognized from the audio stream, compute a relevance metric for the concept, and associate the concept with a time computed based on when the at least one word was spoken. The user interface may include the concept and an indication of the relevance metric and an indication of the time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3 depicts an example process flow for monitoring a spoken-word audio stream for concepts relevant to a user.

DETAILED DESCRIPTION

Figure 1:
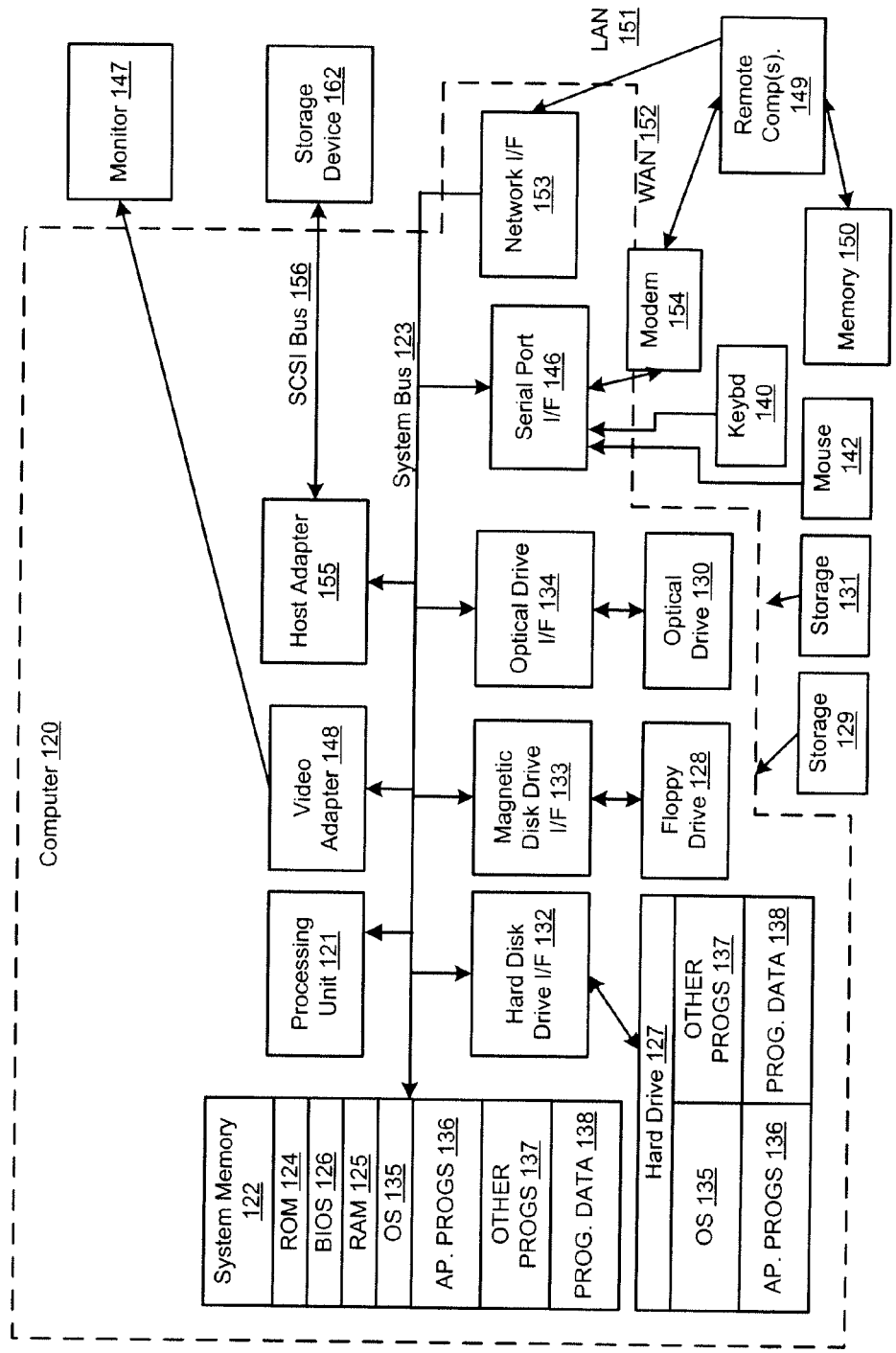
FIG. 1 depicts a block diagram of an example operating environment.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system 126 (BIOS), containing the basic routines that help to transfer information between elements within the personal computer 120, such as during start up, is stored in ROM 124. The personal computer 120 may further include a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer readable media provide non volatile storage of computer readable instructions, data structures, program modules and other data for the personal computer 120. Although the exemplary environment described herein employs a hard disk, a removable magnetic disk 129 and a removable optical disk 131, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner or the like. These and other input devices are often connected to the processing unit 121 through a serial port interface 146 that is coupled to the system bus, but may be connected by other interfaces, such as a parallel port, game port or universal serial bus (USB). A monitor 147 or other type of display device is also connected to the system bus 123 via an interface, such as a video adapter 148. In addition to the monitor 147, personal computers typically include other peripheral output devices (not shown), such as speakers and printers. The exemplary system of FIG. 1 also includes a host adapter 155, Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise wide computer networks, intranets and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used. Moreover, while it is envisioned that numerous embodiments of the present invention are particularly well-suited for computerized systems, nothing in this document is intended to limit the invention to such embodiments.

Figure 2:
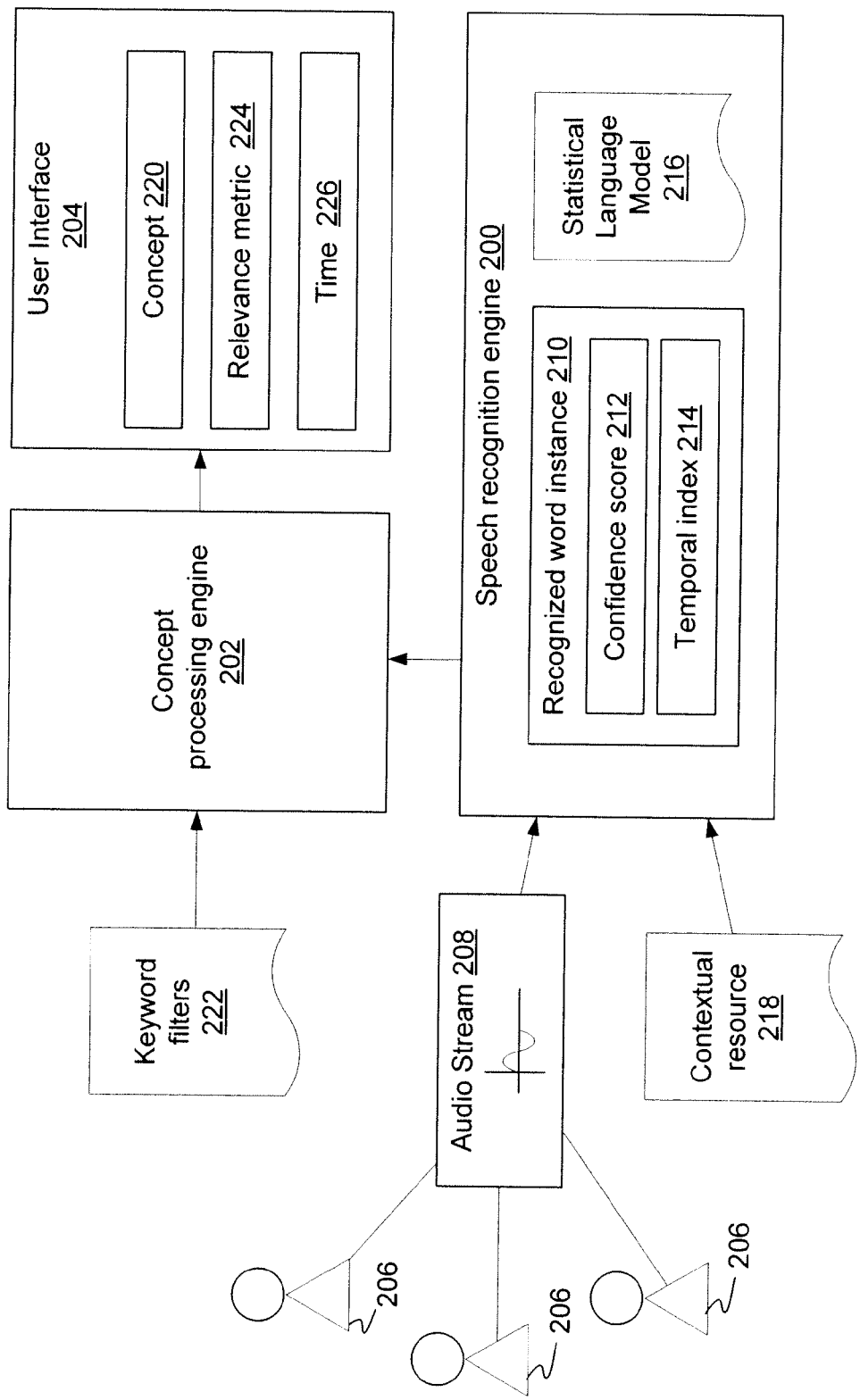
FIG. 2 depicts a block diagram of an example system for monitoring a spoken-word audio stream for concepts relevant to a user.

FIG. 2 depicts a block diagram of an example system for keyword identification from a conversational spoken-language audio stream 208. A system for monitoring a spoken word audio stream 208 for a relevant concept 220 may include a speech recognition engine 200, a concept processing engine 202, and a user interface 204.

Teleconference users 206 may connect via any technology that allows for the transmission and reception of the spoken word audio stream 208. For example, the users 206 may engage in an audio teleconference across the public switched telephone network. For example, the users 206 may engage in a Web telecast, podcast, collaborative Web meeting, and the like. The audio stream 208 may include the voice of one or more users 206. The audio stream 208 may include voice-band information, such as audible information. The users' voices may be recorded in the audio stream 208. The audio stream 208 may be a live audio stream or a recording of a previously occurring session. The audio stream 208 may be stored on a computer, website, personal media player, and the like.

The audio stream 208 may include spoken word audio. For example, the audio stream 208 may include a conversational discussion among users 206 and/or between users 206, a presentation of information, a speech, and the like. The audio stream 208 may be the audio portion of an audio/video teleconference and/or audio/video presentation.

The audio stream 208 may be inputted to a speech recognition engine 200. The speech recognition engine 200 may be any hardware, software, combination thereof, system, or subsystem suitable for discerning a word from a speech signal.

For example, the speech recognition engine 200 may receive the audio stream 208 and process it. The processing may, for example, include hidden Markov model-based recognition, neural network-based recognition, dynamic time warping-based recognition, knowledge-based recognition, and the like.

The speech recognition engine 200 may receive the audio stream 208 and may return recognition results with associated timestamps and confidences. The speech recognition engine 200 may recognize a word and/or phrase from the audio stream 208 as a recognized instance 210. The recognized instance 210 may be associated with a confidence score 212 and a temporal index 214. The speech recognition engine 200 may process the audio stream 208 in real time.

The confidence score 212 may include a number associated with the likelihood that the recognized instance 210 correctly matches the spoken word and/or phrase from the audio stream 208. For example, the confidence score 212 may be a number between zero and one.

The temporal index 214 may be any indication of the relative temporal position of the recognized instance 210 within the audio stream 208. The temporal index 214 may be a time offset relative to the start of the audio stream 208. The temporal index 214 may correspond to the time at which the utterance associated with the recognized instance 210 was uttered in the audio stream 208.

The speech recognition engine 200 may use a statistical language model 216 to recognize text from the audio stream 208. A statistical language model 216 may assign probabilities to words and/or sequences of words. The speech recognition engine 200 may use probability distributions established by the statistical language model 216 to optimize and/or predict recognized instances 210 that are likely to be adjacent to one another. The statistical language model 216 may be trained according to a contextual resource 218. The contextual resource 218 may be inputted to the speech recognition engine 200 to establish a statistical language model 216 that corresponds with the language found in the contextual resource 218. The contextual resource 218 may include word frequencies that map to the subject matter of the audio stream 208. For example, the contextual resource 218 may include agendas, e-mails, related documents, reference materials, and the like. The use of contextual resources to train the statistical language model 216 of the speech recognition engine 200 may improve the accuracy of the speech recognition engine 200 with respect to the audio stream 208.

The speech recognition engine 200 may use a non-statistical grammar to recognize text from the audio stream 208. For example, the non-statistical grammar may be built from known subscribed keywords and their morphological variants. In an embodiment, the non-statistical grammar may include a 'garbage model' around the keywords. The speech recognition engine 200 may use a combination of the statistical language model 216 and the non-statistical grammar to recognize text from the audio stream 208.

The speech recognition engine 200 may pass the resulting recognized instance 210 to the concept processing engine 202. In an embodiment, the speech recognition engine 200 may pass an N-best list of word and/or phrase hypotheses. In an embodiment, speech recognition engine 200 may pass a word-lattice.

The concept processing engine 202 may determine a concept 220 from the at least one word recognized from the audio stream 208. The concept processing engine 202 may process the recognized instance 210 from the speech recognition engine 200 to determine a concept 220 associated with the audio stream 208. The concept processing engine 202 may apply natural language processing to each recognized instance 210 from the speech recognition engine 200. The output of the concept processing engine 202 may include a feed of concepts 220 tagged with a time 226 and a relevance metric. Each concept 220 may be related to the subject matter of the audio stream 208. The output of the concept processing engine 202 may be passed to the user interface 204.

To illustrate, the audio stream 208 may be a teleconference meeting about a "beta release" of software. The participants in the audio stream 208 may utter the words "beta release" frequently. Many of the words uttered during the teleconference may be recognized by the speech recognition engine 200. Based on a natural language processing of the words, the concept processing engine 202 may surface "beta release" as a concept 220 of the audio stream 208.

The concept processing engine 202 may remove stop-words. Stop-words may not indicate the content of a conversation and/or speech. For example, stop-words may include function words such as "the," "of," and "a."

The concept processing engine 202 may apply a morphological normalization to the recognized instance 210. A morphological normalization may include the reduction of inflectional variance of individual terms and/or phrases to a concept 220. To illustrate, the words "recognize," "recognizes," "recognizing," "recognition," and the like may be morphologically normalized to the concept 220 "recognize."

The concept processing engine 202 may screen each recognized instance 210 received from the speech recognition engine 200 based on confidence score 212. For example, the concept processing engine 202 may apply a confidence threshold. Recognized instances 210 with a confidence score 212 below the confidence threshold may not be processed by the concept processing engine 202. In an embodiment, the speech recognition engine 200 may apply the confidence threshold to each recognized instance 210 and pass to the concept processing engine 202 only those recognized instances 210 where the associated confidence score 212 meets and/or exceeds the confidence threshold. The concept processing engine 202 may screen each recognized instance 210 according to its confidence score 212.

The concept processing engine 202 may adjust each respective confidence score 212 according to statistical characteristics of temporally proximate recognized instances 210. For example, the concept processing engine 202 may boost and/or diminish the confidence score 212 provided by the speech recognition engine 200 by applying statistical model across temporally proximate recognized instances 210. In an embodiment, the concept processing engine 202 may boost the respective confidence scores of temporally proximate words where the words form a statistically likely phrase. In an embodiment, the concept processing engine 202 may receive a relationship between and/or among concepts 220. The concept processing engine 202 may boost respective confidence scores of temporally proximate words where the words are associated with related concepts 220.

The concept processing engine 202 may apply a pre-trained classifier to derive individual concepts 220. The pre-trained classifier may be based on training data specific to the subject matter of the audio stream 208. The pre-trained classifier may be an engine that produces one or more ranked concepts in response to a set of one or more words and/or other representation of recognition results as input. The one or more ranked concepts may be associated likelihood scores. The pre-trained classifier may be trained on sample inputs and may be based on neural networks, maximum entropy, support vector machines and/or other statistical techniques.

The concept processing engine 202 may apply a keyword filter 222 to each recognized instance 210 received from the speech recognition engine 200. For example, the concept processing engine 202 may limit concepts 220 to those that conform to the keyword filter 222. In an embodiment, the concept processing engine 202 may receive the keyword filter 222 from a user via the user interface 204. In an embodiment, the concept processing engine 202 may receive the keyword filter 222 associated with the audio stream 208. For example, a host of a teleconference meeting may provide to the concept processing engine 202 the keyword filter 222 associated with the main topics of the teleconference meeting.

The concept processing engine 202 may compute a relevance metric 224 for the concept 220. The relevance metric may be calculated based on frequency of recognition. In an embodiment, the relevance metric may be calculated by multiplying the recognition instance confidence by the frequency of recognition. In an embodiment, relevance may be calculated as a measure of confidence that this concept 220 was discussed within a period of time and/or that the concept 220 was recognized with reasonably high confidence within the immediate past.

In an embodiment, the concepts 220 may be clustered into cluster groups. The relevance metric may be based on abstracting word-level recognition correspondences away and focusing on lower level acoustic similarity. Clustering the concepts may include examining the component acoustic properties of each recognized concept. For example, the phonemes that constitute its pronunciation may be examined. Clustering may include computing similarity measures based on proximity of the individual components between recognition results and assigning similar recognitions into concept clusters. Recognitions with similar acoustic properties may be returned as a cluster associated with a single concept. Recognitions that may be returned as a cluster associated with a single concept may not be similar at a lexical level.

In an embodiment, the relevance metric may be calculated according to a "uncertainty reduction" method. The "uncertainty reduction" may include a mechanism that favors the recognition of terms previously recognized successfully. The 'uncertainty reduction' method may apply techniques that favor the output of terms that may have been previously recognized. The method may favor terms that have been previously recognized explicitly. For example, the method may favor terms that are present in a top-scoring recognition output. The method may favor terms that have been previously recognized implicitly. For example, or implicitly the method may favor terms that are present in the recognition lattice but not necessarily in the top-scoring recognition output. In this way, the repetition of hypotheses within the results may contribute to a reduction of uncertainty. The relevance metric for occurrences may improve over time.

The concept processing engine 202 may associate the concept 220 with a time 226 computed based on the at least one word was spoken. The concept processing engine 202 may associate each concept 220 with a time 226 selected from the temporal indices of the recognized instances 210 related to the concept 220. The concept processing engine 202 may average temporal indices 214 of the recognized instances 210 related to the concept 220 to select a time 226 to associate with the concept 220. The concept processing engine 202 may establish a window within which recognized instances 210 are processed into concepts 220, and the concept processing engine 202 may select a time 226 to associate with the concept 220 based on the window. The concept processing engine 202 may output the resulting concept 220 and associated time 226 and relevance metric for further processing and/or presentation. In an embodiment, the concept processing engine 202 may output to a user interface 204. In an embodiment, the concept processing engine 202 may output and to a software module adapted to receive the output. For example, a targeted advertising application may receive the output to generate targeted advertisements associated with the audio feed. The targeted advertisements may be displayed to the user's engaged with the audio stream 208.

The computer interface may receive a concept 220, a relevance metric associated with the concept 220, and a time 226 associated with the concept 220 from the concept processing engine 202. The user interface 204 may be a graphical user interface 204 associated with operating system of the personal computer, laptop computer, handheld computer, cellular phone, and the like. The computer user interface 204 for monitoring a spoken-word audio stream 208 for a relevant concept 220 may include a displayed concept 204, an indication of a time 226 associated with the concept 220, and an indication of a relevance metric 226 associated with the concept 220.

The displayed concept 204 may include a graphical and/or textual representation of the concept 220. For example, the display concept 204 may include an English text representation of the word. For example, the displayed concept 204 may include a graphic icon depicting the concept 220.

The indication of time 226 may include any dynamic representation that associates the concept 220 to a segment of time. The indication of time 226 may include an animation and/or other dynamic visual. For example, the appearance and/or disappearance of the indication of the concept 220 may indicate the time 226 associated with the concept 220.

The indication of the relevance metric 226 may include a graphical and/or textual representation of the relevance metric 226 associated with the concept 220. For example, the indication of the relevance metric 226 may include text such as "high," "medium," and "low." Also for example, the indication of the relevance metric 226 may include an graphical element that changes shape, position, and/or color relative to the relevance metric 226.

Each displayed concept 204 may include a reference to other content. The displayed concept 204 may include a hyperlinks or other redirection mechanism for associating content with the concept 220. For example, the user may click with a computer mouse on the concept 220 and be redirected in an associated web browser to search results of the meeting materials. For example, the hyperlink may return a portion of the audio stream 208 that contains a mention of the concept 220.

The user interface 204 may include a feedback loop mechanism. The quality of the system may be improved and/or optimized by the interaction of users 206 to confirm or deny the hypotheses of the system. The user interface 204 may include a voting mechanism whereby the user may confirm that the system has correctly identified the concept 220 or indicate that it has misrecognized the concept 220 and/or improperly assessed the relevance. Such feedback may be used to improve the system's accuracy, tune the concept 220 determination, and the like.

In an embodiment, the user interface 204 may present a rolling set of concepts 220 in real time as the audio progresses. For example, concepts 220 with the highest relevance weight may be presented most prominently, and those which may be less relevant, but still recognized with some degree of frequency and/or confidence, may be presented less prominently. The user interface 204 may present a summary of concept 220 occurrence over a period of the audio.

The user interface 204 may be adapted to receive a keyword filter 222 from the user. The user interface 204 may be adapted to receive feedback from the user. The feedback may be an indication from the user that the concept 220 being displayed is an accurate representation of the audio stream 208.

While the embodiment shown in FIG. 2 describes functionality associated with particular modules, the system for keyword identification from a conversational spoken-language audio stream 208 may include the functionality presented in a different architecture. For example, functionality of the speech recognition engine 200, concept processing engine 202, and user interface 204 may be combined into a single module. Also for example, the functionality of the speech recognition engine 200, concept processing engine 202, and user interface 204 may be implemented across any number of modules in one or more computing devices.

FIG. 3 depicts an example process flow 300 for keyword identification from a conversational spoken-language audio stream 208. The process flow 300 may be implemented in computer executable instructions. At 302, the speech recognition engine 200 may recognize a plurality of words from the audio stream 208. The speech recognition engine 200 may recognize the plurality of words according to statistical language model 216. The statistical language model 216 may be optimized with a contextual document associated with the audio stream 208. The speech recognition engine 200 may determine a confidence score 212 for each word of the player plurality of words. Each word may be screened according to a comparison of the respective confidence score 212 and a confidence threshold. Each respective confidence score 212 may be adjusted according to a statistical characteristic of the temporally proximate words. The plurality of words may be formatted as a word lattice, an N-best list, and the like.

At 304, function words and may be removed from the plurality of words. Function words may include words that do not impart meaning to the core content of the discussion. Function words may include grammar specific words such as "the," "of," and "a."

At 306, a concept 220 may be determined from at least one word recognized from the audio stream 208. The concept 220 may be determined by performing a morphological normalization of the plurality of words. The concept 220 may be determined by a statistical process. For example, a pre-trained classifier may be applied to the plurality of words to determine the concept 220. The concept 220 may be a single word or multiple words. The concept 220 may be a phrase. The concept 220 may be any indication associated with a particular subject matter and/or content being discussed and/or mentioned in an audio stream 208. A keyword may be received from a user. The concept 220 may be determined from at least one word recognized from the audio based on filtering via the keyword received from the user.

At 308, the concept 220 may be associated with a time 226 within the audio stream 208 related to when the at least one word was spoken. The time 226 associated with the concept 220 may be the time 226 when the at least one word was spoken. Where the concept 220 relates to more than one word recognized from the plurality of words, the time 226 associated with the concept 220 may be an average time. The time 226 associated with the concept 220 may be related to a window of time within which the at least one word was spoken and/or repeated.

At 310, a relevance metric for the concept 220 may be computed. The relevance metric may be based on the confidence score 212 associated with the at least one word from which the concept 220 was determined. The relevance metric may be computed according to the temporal frequency of the concept 220 within the audio stream 208. The relevance metric may be determined according to a clustering principle. And relevance metric may be computed according to an "uncertainty reduction" method.

At 312, a graphical interface may be displayed. The graphical interface may include a concept 220 and an indication of the associated time 226 and relevance metric 224. The graphical interface may receive feedback from the user.

Figure 4A:
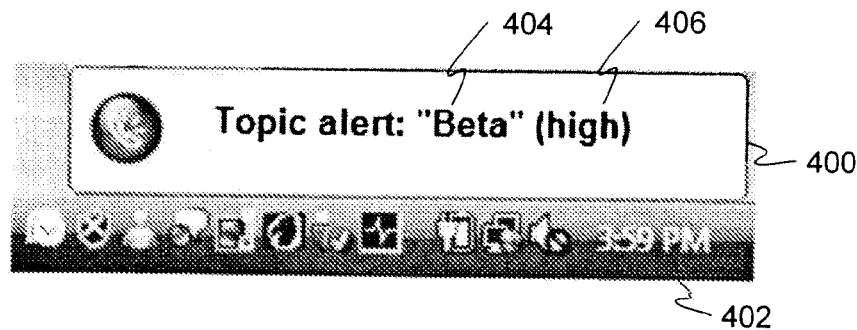
FIGS. 4*a-c* depict example user interfaces for monitoring a spoken-word audio stream for concepts relevant to a user.
Figure 4B:
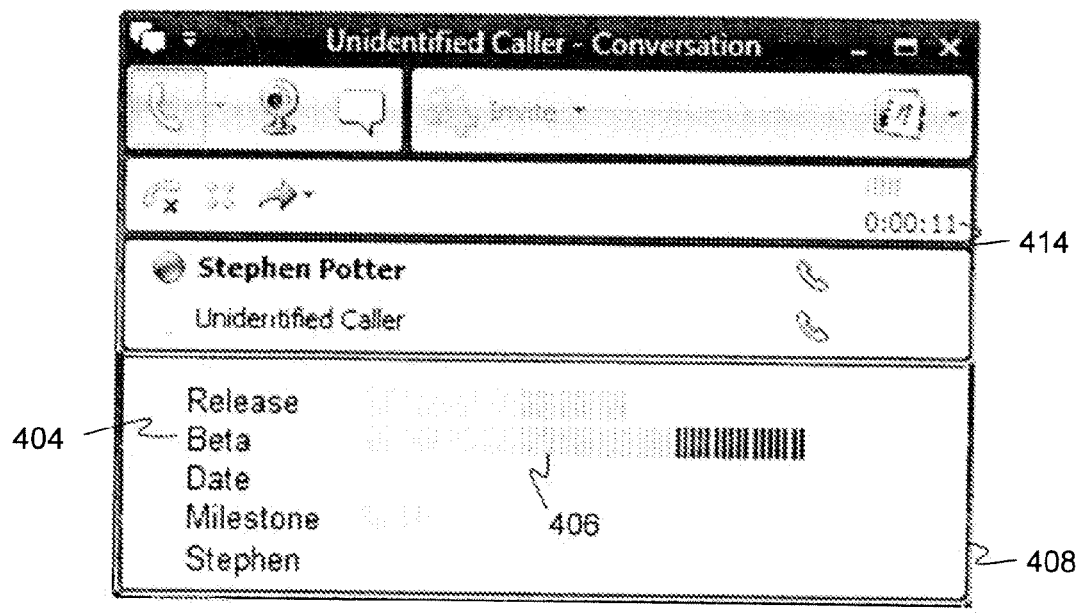
Figure 4C:
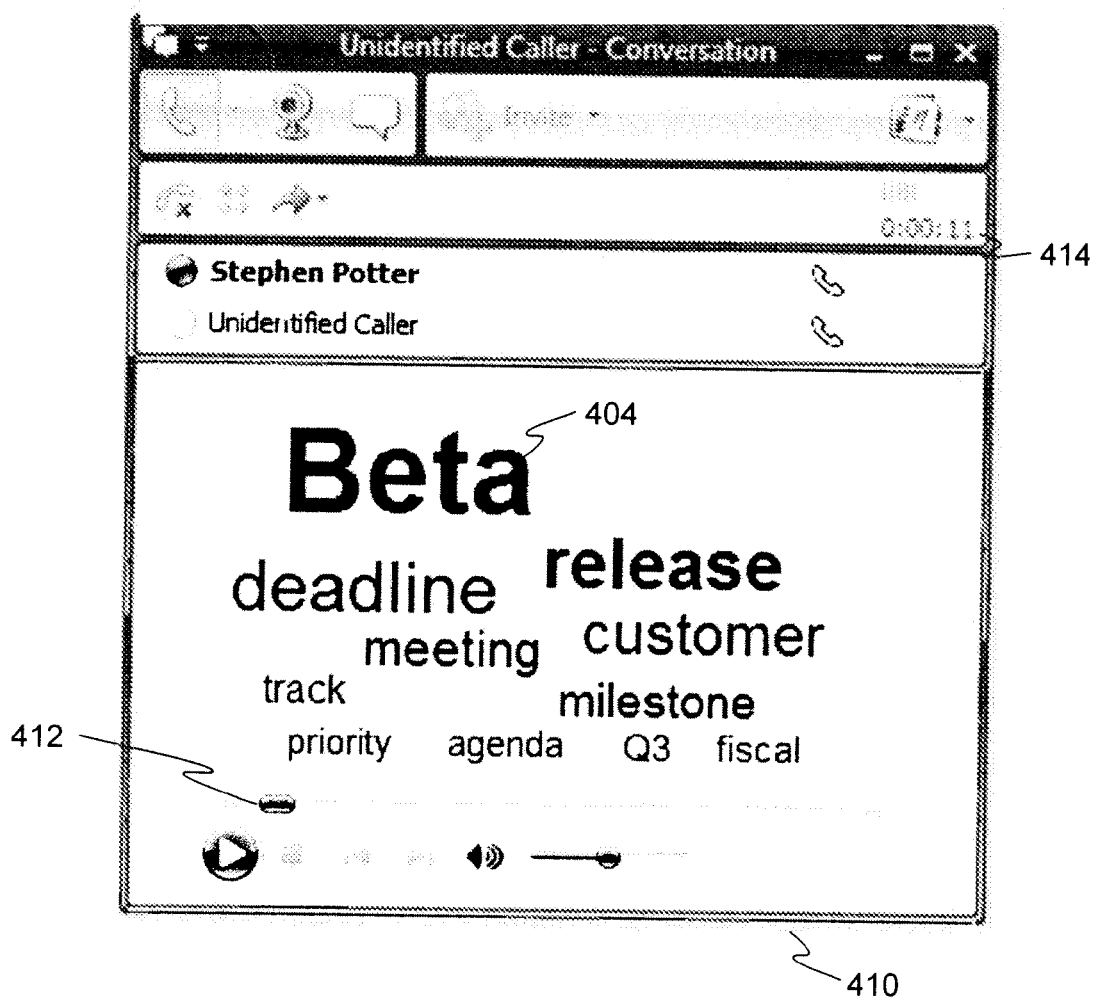

FIG. 4a-c depict example user interfaces for displaying keyword identification from a conversational spoken-language audio stream 208. FIG. 4a depicts a keyword alert user interface 400. The keyword alert user interface 400 may appear to the user as a desktop 'toast.' The keyword alert user interface 400 may present itself in relation to a toolbar 402 on the user's computer desktop. The keyword alert user interface 400 may include a displayed concept 404 in text form. The keyword alert user interface 400 may indicate a time 226 according to when the keyword alert user interface 400 appears, changes, and/or disappears relative to the toolbar 402. The keyword alert user interface 400 may include an indication of the relevance metric 406, textually as a "high," "medium," and/or "low."

The user may subscribe, a priori, to a set of keywords of interest. The keyword alert user interface 400 may filter concepts 220 that match the keywords of interest to the user. The keyword alert user interface 400 may include the displayed concept 404 and the displayed relevance metric 406. To illustrate, FIG. 4a depicts a displayed concept 404 matching the keyword "Beta." The keyword alert user interface 400, when presented to the user, may alert the user to join and/or pay attention to the conference call.

FIG. 4b depicts a "heat" monitoring user interface 408. The "heat" monitoring user interface 408 may provide a continuous monitoring mechanism. The user may subscribe to a keyword. The "heat" monitoring user interface 408 may include the displayed concept 404 and the corresponding displayed relevance metric 406. The "heat" monitoring user interface 408 may present the relevance metric 224 as a graphical bar 406. The graphical bar 406 may change color or size relative to the relevance metric 224. The "heat" monitoring user interface 408 may indicate a time 226 according to when the graphical bar 406 appears, changes, and/or disappears. The "heat" monitoring user interface 408 may indicate a time 226 according to a timer 414. The timer 414 may correspond to the elapsed time within the audio stream 208

FIG. 4c depicts a keyword cloud user interface 410. The displayed concept 404 may be presented in the keyword cloud user interface 410. The relevance metric 224 may be presented via the font size, font type, and/or position of the displayed concept 404. For example, a high relevance metric 224 may be displayed in larger, bold type, and high on the y-axis of the display. The keyword cloud user interface 410 may indicate a time 226 according to a timer 414. The timer 414 may correspond to the elapsed time within the audio stream 208

In an embodiment, the cloud user interface 410 may include a dynamic representation of time 226. For example, a concept 220 being introduced for the first time may be added to the set in the lower right portion of the display. A concept 220 that has increased in relevance may be promoted in the y-axis and gain in font size and/or boldness. In such a representation, the lowest line of concepts 220 may include a moving 'ticker-tape.' The next-higher line may move slower than the lowest line, indicating a greater relevance. The top line may move the slowest and may indicate the most frequent and highest confidence concepts 220 over a time period.

In an embodiment, the cloud user interface 410 may present a representation of an entire audio stream 208 and/or any subset of the entire audio stream 208. The cloud user interface 410 may be used as a high-level "at a glance" summary of the audio stream 208 content, and/or it may be used as an entry point for listening to parts of the audio for topics of interest. The cloud user interface 410 may include a time window. The time window may be associated with an audio controller 412. The audio controller 412 may indicate the relative current position within an audio stream 208. The cloud user interface 410 may variably change responsive to a user adjusting the audio controller 412. The audio controller 412 may include a graphical element that moves from left to right according to the temporal position within the audio stream 208. The associated time 226 may be indicated by the position of the audio controller 412.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A tangible computer-readable medium for monitoring a spoken-word audio stream for a relevant concept, the computer-readable medium having computer instructions stored thereon that, when executed, perform a method, comprising:
   determining a concept from at least one word recognized from the audio stream,
   associating the concept with a time related to when the at least one word was spoken;
   computing a relevance metric for the concept; and
   displaying a graphical interface comprising the concept and an indication of the time and relevance metric.

2. The tangible computer-readable medium of claim 1, wherein computing the relevance metric comprises assessing the temporal frequency of the concept within the audio stream.

3. The tangible computer-readable medium of claim 1, further comprising receiving a keyword from a user and wherein associating the concept with at least one word recognized from the audio stream comprises filtering based on the keyword.

4. The tangible computer-readable medium of claim 1, further comprising recognizing a plurality of words from the audio stream via a speech recognition engine.

5. The tangible computer-readable medium of claim 4, further comprising removing function words that do not indicate content from the plurality of words.

6. The tangible computer-readable medium of claim 4, wherein determining the concept comprises performing a morphological normalization of the plurality of words.

7. The tangible computer-readable medium of claim 4, wherein determining the concept from the at least one word recognized from the audio stream comprises applying a pre-trained classifier to the plurality of words.

8. The tangible computer-readable medium of claim 4, wherein the plurality of words comprises a word lattice.

9. The tangible computer-readable medium of claim 4, further comprising optimizing a statistical language model with a contextual document associated with the audio stream, wherein recognizing the plurality of words comprises recognizing the plurality of words according to the statistical language model.

10. The tangible computer-readable medium of claim 4, wherein recognizing the plurality of words comprises determining a respective confidence score for each word of the plurality of words and wherein determining the concept comprises screening each word according to a comparison of the respective confidence score and a confidence threshold.

11. The tangible computer-readable medium of claim 10, further comprising adjusting each respective confidence score according to statistical characteristics of temporally proximate words.

12. The tangible computer-readable medium of claim 10, wherein the relevance metric for the concept is based on the respective confidence score for each of the at least one word.

13. A computer user interface for monitoring a spoken-word audio stream for a relevant concept, wherein at least one word is recognized from the audio stream by a speech recognition engine, the user interface comprising:
   a displayed concept that is determined from the at least one word;
   a displayed indication of a time associated with the concept, the time being computed according to when the at least one word was spoken;
   a displayed indication of a relevance metric associated with the concept; and
   a graphical user interface generated by a processor comprising the displayed concept, the displayed indication of the time, and the displayed indication of the relevant metric.

14. The computer user interface of claim 13, wherein the concept is displayed as a graphical bar, and the position of the graphical bar changes relative to the time.

15. The computer user interface of claim 13, wherein the concept is displayed as a graphical bar, and the size of the graphical bar changes relative to the relevance metric.

16. The computer user interface of claim 13, wherein graphical bar comprises a color and the color changes relative to the relevance metric.

17. The computer user interface of claim 13, wherein the displayed concept comprises a font size and the font size is relative to the relevance metric.

18. The computer interface of claim 13, wherein the displayed concept scrolls relative to a position within a window and scrolls at a speed, wherein the position and speed are relative to the relevance metric.

19. A system for monitoring a spoken-word audio stream for a relevant concept, the system comprising:
   a concept processing engine, executed on a processor, that determines the concept from at least one word recognized from the audio stream, computes a relevance metric for the concept, and associates the concept with a time computed based on when the at least one word was spoken; and
   a user interface comprising the concept and an indication of the relevance metric and the time.

20. The system of claim 19, further comprising a speech recognition engine that recognizes the at least one word and that determines a confidence score for the at least one word and screens the at least one word according to a comparison of the confidence score and a confidence threshold.

* * * * *